US012720299B2

(12) United States Patent
Mariyani et al.

(10) Patent No.: US 12,720,299 B2
(45) Date of Patent: Aug. 25, 2026

(54) WIRELESS COMMUNICATION SERVICE BASED ON A SHARED SUBSCRIBER PROFILE

(71) Applicant: T-MOBILE INNOVATIONS LLC, Overland Park, KS (US)

(72) Inventors: Anil Kumar Mariyani, Ashburn, VA (US); Subramania Kaushik, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 318 days.

(21) Appl. No.: 18/356,601

(22) Filed: Jul. 21, 2023

(65) Prior Publication Data

US 2025/0031029 A1 Jan. 23, 2025

(51) Int. Cl.
*H04W 8/20* (2009.01)

(52) U.S. Cl.
CPC .................................... *H04W 8/20* (2013.01)

(58) Field of Classification Search
CPC ......... H04W 8/12; H04W 8/186; H04W 8/18; H04W 48/14; H04W 4/08; H04W 68/02; H04W 60/00; H04W 8/20; H04L 67/306; H04L 65/1073; H04L 65/1016
USPC ........................ 455/435.1, 432.1, 432.3, 433
See application file for complete search history.

(56) References Cited

U.S. PATENT DOCUMENTS 8,046,381 B2 10/2011 Cai et al.
8,644,460 B2 2/2014 Tai et al.
8,861,404 B2 10/2014 Cai et al.
8,918,526 B2 12/2014 Tai et al.
9,059,948 B2 6/2015 Schaedler et al.
2008/0275883 A1 11/2008 Ashraf et al.
2010/0229192 A1* 9/2010 Marilly ................. H04L 67/306 725/34
2018/0332441 A1* 11/2018 Shaw .................... H04L 41/122
2019/0238345 A1* 8/2019 Gage ....................... H04L 9/088
2020/0374687 A1* 11/2020 Hua ........................ H04W 8/12
2022/0295266 A1* 9/2022 Chang ..................... H04W 8/26
2024/0121613 A1* 4/2024 Kahn .................... H04W 12/35
2024/0121699 A1* 4/2024 Agcaoili ............... H04W 48/16

* cited by examiner

*Primary Examiner* — David Q Nguyen

(57) ABSTRACT

A wireless communication system serves wireless communication devices based on individual subscriber profiles and a shared subscriber profile. The wireless communication system stores the individual subscriber profiles and stores the shared subscriber profile. The wireless communication system serves the wireless communication devices based on the individual subscriber profiles. The wireless communication system determines when the individual subscriber profiles are unavailable for the wireless communication devices. In response, the wireless communication system serves the wireless communication devices based on the shared subscriber profile.

20 Claims, 11 Drawing Sheets

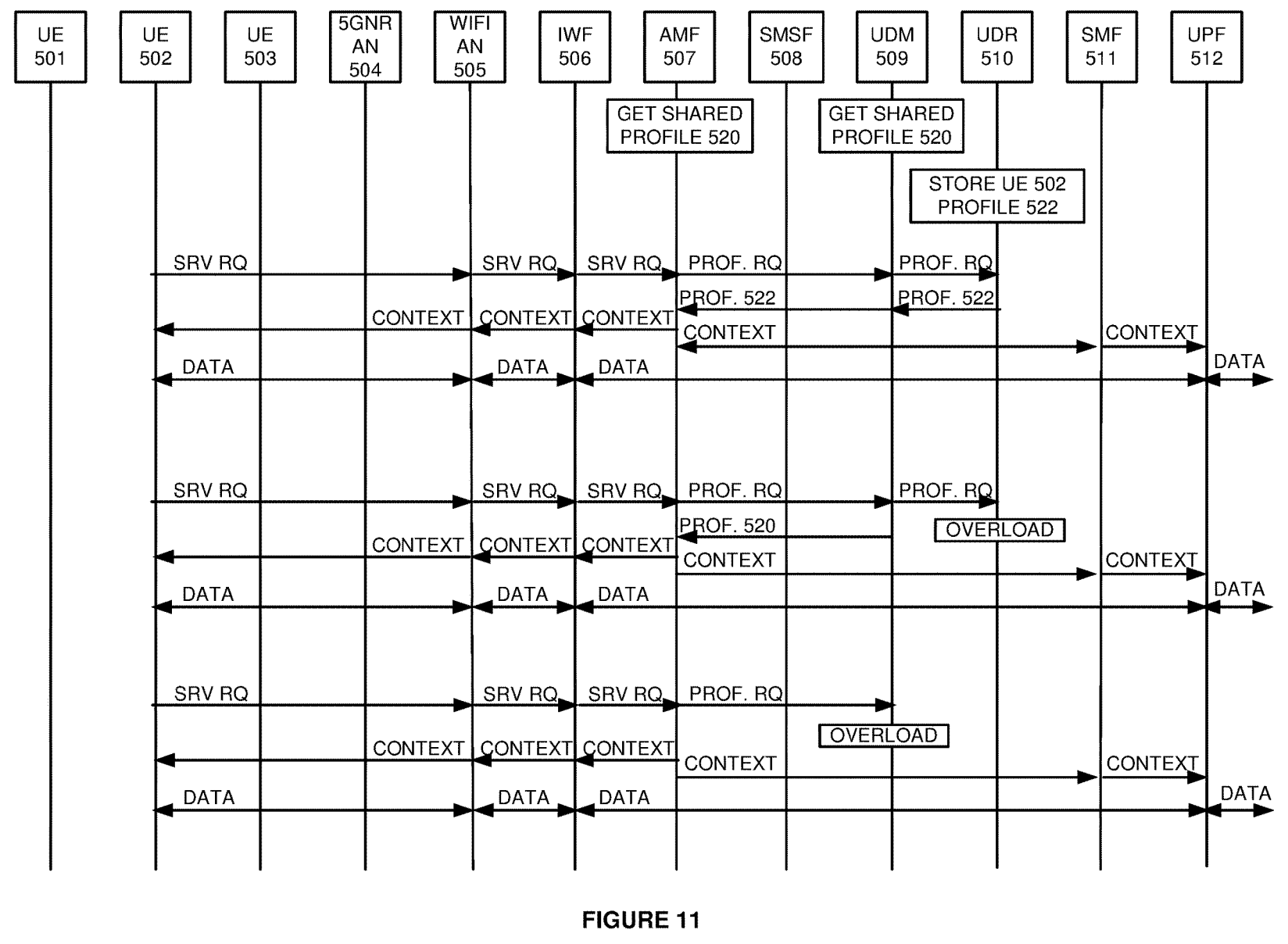

UE 501

UE 502

UE 503

5GNR AN 504

WIFI AN 505

IWF 506

AMF 507

SMSF 508

UDM 509

UDR 510

SMF 511

UPF 512

GET SHARED PROFILE 520

GET SHARED PROFILE 520

STORE UE 502 PROFILE 522

SRV RQ

PROF. RQ

PROF. 522

CONTEXT

DATA

PROF. 520

OVERLOAD

FIGURE 11

WIRELESS COMMUNICATION SERVICE BASED ON A SHARED SUBSCRIBER PROFILE

TECHNICAL BACKGROUND

Wireless communication networks provide wireless data services to wireless communication devices like phones, computers, and other user devices. The wireless data services may include internet-access, data messaging, video conferencing, or some other data communication functionality. The wireless communication networks comprise wireless access nodes like Wireless Fidelity (WIFI) hotspots and Fifth Generation New Radio (5GNR) cell towers.

The wireless communication networks comprise network elements like Access and Mobility Management Functions (AMFs) and Short Message Service Functions (SMSFs) that control the wireless data services that are delivered to the wireless communication devices. The AMFs authorize the wireless communication devices to use their wireless data services. The AMFs also determine Quality-of-Service (QOS) and network policies that control the delivery of the wireless data services to the wireless communication devices. The wireless communication networks also have network elements like Unified Data Management (UDMs) and Unified Data Repositories (UDRs) that support the AMFs and SMSFs by providing data access and storage. For example, an AMF interacts with a UDM to obtain individual network selection information for an individual wireless communication device. An SMSF interacts with a UDM to obtain individual data messaging attributes for an individual wireless communication device.

The UDM retrieves subscriber data from the UDR. In particular, the UDR stores individual profiles for each subscriber. The subscriber profiles control the wireless data services for individual subscribers. For example, an individual subscriber profile indicates the data networks that an individual subscriber is authorized to use and the Quality-of-Service (QOS) levels for their wireless data services. When the UDR is unavailable due to an overload or some other reason, then the UDM cannot obtain these individual subscriber profiles and the delivery of the wireless data services to the subscribers is disrupted. Although some network elements like Policy Control Functions (PCFs) and Session Management Functions (SMFs) maintain default policies and QoS levels, the other information in the subscriber profiles is not available when the UDR is down.

The massive growth of subscribers and wireless data services on modern wireless communication networks has caused a corresponding growth in the individual subscriber profiles that are stored in the UDR. Unfortunately, the UDRs may get overloaded or otherwise fail due to this massive growth. Moreover, the wireless data services may be denied to subscribers when their individual subscriber profiles are not available from the faulty UDRs. The wireless communication networks do not provide adequate service availability to subscribers when faced with network function issues. The wireless communication networks do not help its network functions quickly recover from overload conditions due to the new additional traffic required to complete the recovery.

Technical Overview

In some examples, a method to serve wireless communication devices based on individual subscriber profiles and a shared subscriber profile comprises the following. The individual subscriber profiles and the shared subscriber profile are stored. The wireless communication devices are served based on the individual subscriber profiles. When one or more of the individual subscriber profiles is unavailable for one or more of the wireless communication devices, the one or more of the wireless communication devices is served based on the shared subscriber profile.

In some examples, one or more non-transitory machine-readable storage media store processing instructions that direct processing circuitry to serve wireless communication devices based on individual subscriber profiles and a shared subscriber profile by performing a method that comprises the following. The individual subscriber profiles and the shared subscriber profile are stored. The wireless communication devices are served based on the individual subscriber profiles. When one or more of the individual subscriber profiles is unavailable for one or more of the wireless communication devices, the one or more of the wireless communication devices is served based on the shared subscriber profile.

In some examples, a wireless communication network serves User Equipment (UEs) based on individual subscriber profiles and a shared subscriber profile. The wireless communication system comprises a Unified Data Repository (UDR) and a Unified Data Management (UDM). The UDR stores the individual subscriber profiles. The UDM stores the shared subscriber profile. The UDM serves the UEs based on the individual subscriber profiles. The UDM determines when one or more of the individual subscriber profiles is unavailable for one or more of the UEs. In response, the UDM serves the one or more of the UEs based on the shared subscriber profile.

In some examples, a wireless communication network serves User Equipment (UEs) based on individual subscriber profiles and a shared subscriber profile. The wireless communication system comprises an Access and Mobility Management Function (AMF), Short Message Service Function (SMSF), and other network functions that store a shared subscriber profile. The UDR stores the individual subscriber profiles. The AMF, SMSF, and the other network functions serve the UEs based on the individual subscriber profiles. The AMF, SMSF, and the other network functions determine when one or more of the individual subscriber profiles is unavailable for one or more of the UEs. In response, the AMF, SMSF, and the other network functions serve the one or more of the UEs based on the shared subscriber profile.

DESCRIPTION OF THE DRAWINGS

FIG. 11 illustrates an exemplary operation of the wireless communication network to serve UEs based on individual subscriber profiles and a shared subscriber profile.

DETAILED DESCRIPTION

Figure 1:
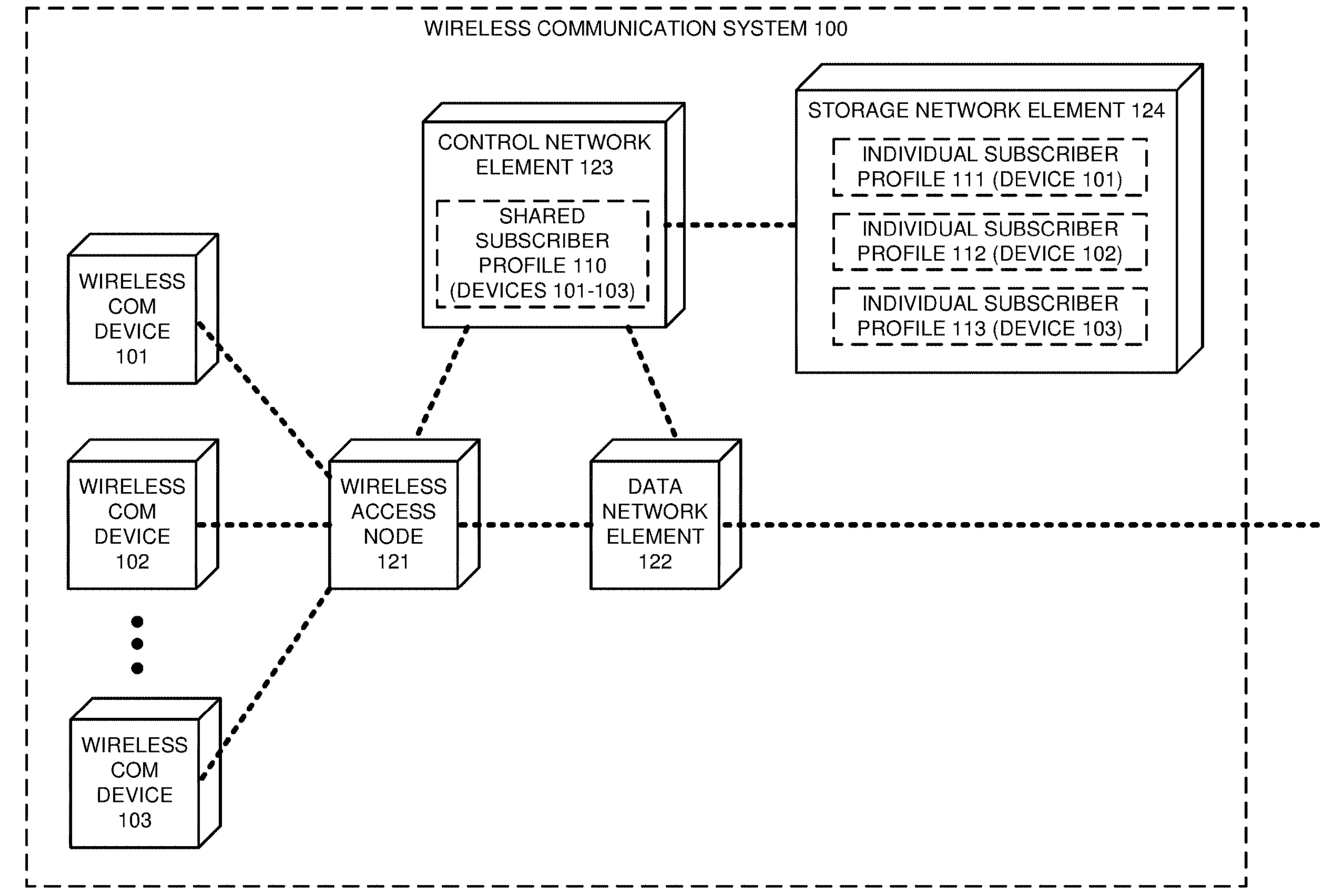
FIG. 1 illustrates an exemplary wireless communication system to serve wireless communication devices based on individual subscriber profiles and a shared subscriber profile.

FIG. 1 illustrates exemplary wireless communication system 100 to serve wireless communication devices 101-103 based on individual subscriber profiles 111-113 and shared subscriber profile 110. Wireless communication system 100 comprises wireless communication (COM) devices 101-103, wireless access node 121, data network element 122, control network element 123, and storage network element 124. Wireless communication system 100 serves wireless data services to wireless communication devices 101-103 like internet-access, data messaging, media conferencing, or some other data communications product. The amount of wireless communication devices, wireless access nodes, and network elements that are shown in FIG. 1 has been restricted for clarity.

Control network element 123 stores shared subscriber profile 110 for wireless communication devices 101-103. Storage network element 124 stores individual subscriber profile 111 for wireless communication device 111. Storage network element 124 stores individual subscriber profile 112 for wireless communication device 112. Storage network element 124 stores individual subscriber profile 113 for wireless communication device 113. Subscriber profiles 110-113 specify data communication characteristics for slices, network names, network types, messaging, roaming, authentication, radio technology, and/or some other communication parameters. Note that storage network element 124 which stores individual subscriber profiles 111-113 is a different network element from control network element 123 which stores shared subscriber profile 110.

Wireless communication device 101 exchanges user data over wireless access node 121 and data network element 122. Control network element 123 obtains individual subscriber profile 111 from storage network element 124 and controls the exchange of the user data by wireless communication device 101 based on individual subscriber profile 111. For example, control network element 123 may use specific authentication mode and slice information for wireless communication device 101 based on the individual authentication mode and slice information in individual subscriber profile 111.

Wireless communication device 102 exchanges user data over wireless access node 121 and data network element 122. Control network element 123 obtains individual subscriber profile 112 from storage network element 124 and controls the exchange of the user data by wireless communication device 102 based on individual subscriber profile 112. For example, control network element 123 may use a specific network name and radio technology for wireless communication device 102 based on the individual network name and radio technology in individual subscriber profile 112.

Wireless communication device 103 exchanges user data over wireless access node 121 and data network element 122. Control network element 123 obtains individual subscriber profile 113 from storage network element 124 and controls the exchange of the user data by wireless communication device 103 based on individual subscriber profile 113. For example, control network element 123 may use specific messaging service attributes and roaming attributes for wireless communication device 103 based on the individual messaging service attributes and roaming attributes in individual subscriber profile 113.

Eventually, control network element 123 determines that it cannot obtain individual subscriber profile 111 for wireless communication device 101 due to an overload in storage network element 124, profile 111 data corruption, network signaling outage, or some other cause. When control network element 123 cannot obtain individual subscriber profile 111, control network element 123 controls the exchange of the user data by wireless communication device 101 based on shared subscriber profile 110. For example, control network element 123 may select network slices for wireless communication device 101 based on the shared slice information in shared subscriber profile 110.

Eventually, control network element 123 determines that it cannot obtain individual subscriber profile 112 for wireless communication device 102 due to an overload in storage network element 124, profile 112 data corruption, network signaling outage, or some other cause. When control network element 123 cannot obtain individual subscriber profile 112, control network element 123 controls the exchange of the user data by wireless communication device 102 based on shared subscriber profile 110. For example, control network element 123 may select network elements to serve wireless communication device 102 based on a shared network name in shared subscriber profile 110.

Eventually, control network element 123 determines that it cannot obtain individual subscriber profile 113 for wireless communication device 103 due to an overload in storage network element 124, profile 113 data corruption, network signaling outage, or some other cause. When control network element 123 cannot obtain individual subscriber profile 113, control network element 123 controls the exchange of the user data by wireless communication device 103 based on shared subscriber profile 110. For example, control network element 123 may use a messaging service version for wireless communication device 103 based on the shared messaging service attributes in shared subscriber profile 110.

Subscriber profiles 110-113 specify data communication characteristics for slices, network names, network types, messaging, roaming, authentication, radio technology, and/or some other communication parameters. The slice characteristics comprise Network Slice Selection Assistance Information (NSSAIs), Slice/Service Types (SSTs), Slice Differentiators. (SDs), and/or some other slice information that may be mapped to Subscriber Permanent Identifiers (SUPIs) or International Mobile Station Identifiers (IMSIs). The network name characteristics comprise data Dynamic Network Names (DNNs) or some other network identifier for data services, internet-access, voice-calling, video-conferencing, Internet Protocol Multimedia Subsystem (IMS), emergency, and/or some other data communication networks. The network name characteristics may indicate Ambient Bit Rate (AMBR), QoS levels, and other default attributes. The radio technology characteristics comprise Radio Access Technology Type (RAT) or some other network access indicator for Wireless Fidelity, (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications. The messaging characteristics comprise message service authorization, message service versions, message service addresses, and/or some other data messaging information. The roaming characteristics comprise authorized geographic areas, unauthorized geographic areas, authorized communication networks, unauthorized communication networks, home roaming attributes, domestic roaming attributes, and/or some other roaming parameters. The authentication characteristics comprise authentication type (like Fifth Generation Authentication and Key Management), authentication version, and/or some other authentication parameters.

Wireless communication devices 101-103 comprise phones, computers, vehicles, sensors, or some other user communication apparatus. Wireless access node 121 comprises a wireless base station, wireless router, wireless server, and/or some other wireless communication apparatus. Data network element 122 comprises a User Plane Function (UPF), Interworking Function (IWF), Gateway (GW), and/or some other data transfer apparatus. Control network element 123 comprises a Unified Data Management (UDM), Access and Mobility Management Function (AMF), Short Message Service Function (SMSF), Session Management Function (SMF), Policy Control Function (PCF), Network Exposure Function (NEF), Interworking Function (IWF) and/or some other communication control apparatus. Storage network element 124 comprises a Unified Data Repository (UDR), Unstructured Data Storage Function (UDSF), Home Subscriber System (HSS), or some other data storage apparatus. Any of these network elements 122-123 may obtain and use shared subscriber profile 110 as described herein. Network elements 122-123 only use shared subscriber profile 110 for authenticated subscribers. For example, an AMF, SMSF, or UDM will only use a shared subscriber profile for a subscriber that was already authenticated by an Authentication Server Function (AUSF). The AUSF does not use shared subscriber profiles.

Wireless communication devices 101-103 and wireless access node 121 comprise one or more radios that wirelessly communicate using wireless protocols like Wireless Fidelity, (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications. Wireless communication devices 101-103, access node 121, and network elements 122-124 comprise microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein.

Figure 2:
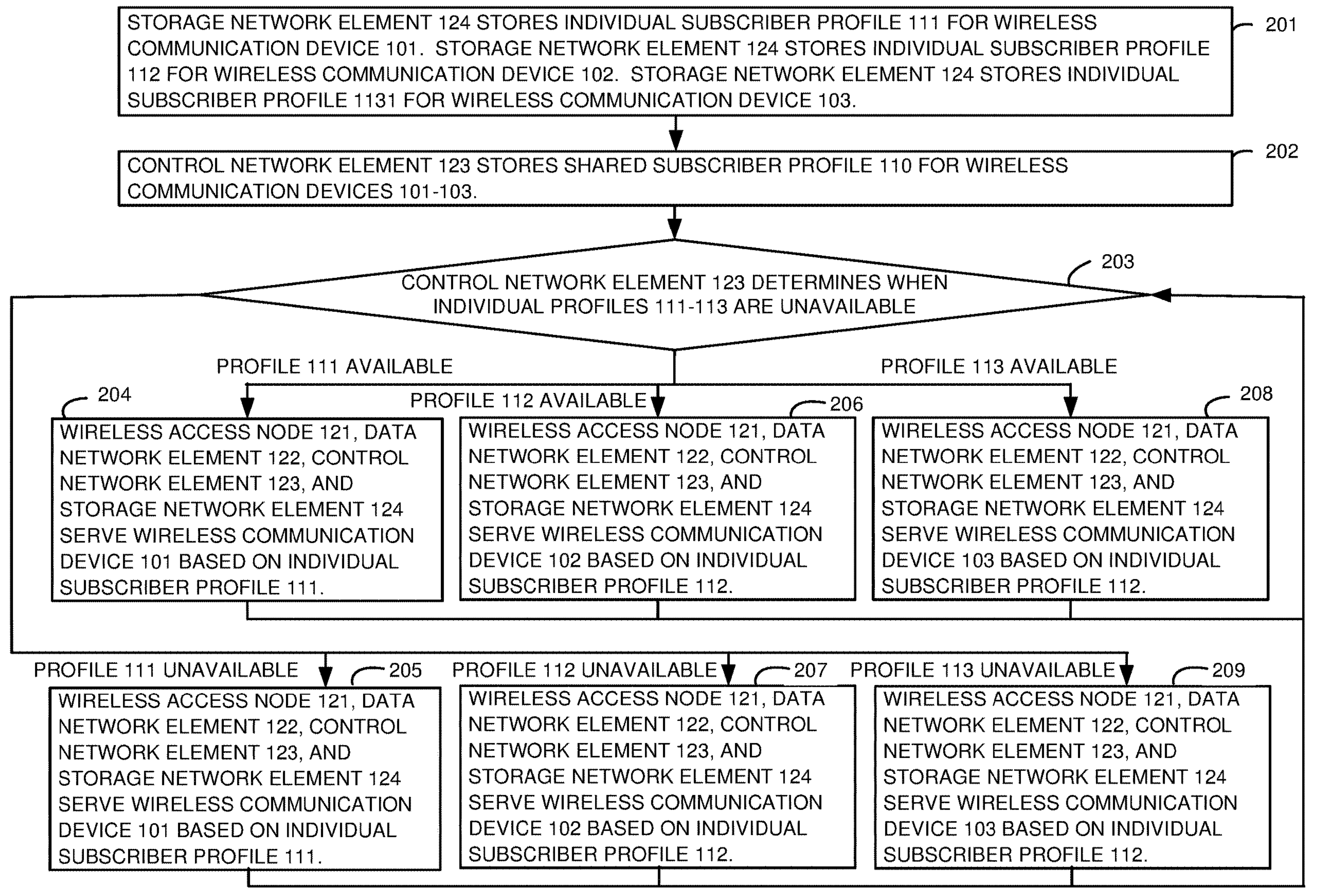
FIG. 2 illustrates an exemplary operation of the wireless communication system to serve wireless communication devices based on individual subscriber profiles and a shared subscriber profile.

FIG. 2 illustrates an exemplary operation of wireless communication system 100 to serve wireless communication devices 101-103 based on individual subscriber profiles 111-113 and shared subscriber profile 110. Storage network element 124 stores individual subscriber profile 111 for wireless communication device 111 (201). Storage network element 124 stores individual subscriber profile 112 for wireless communication device 112 (201). Storage network element 124 stores individual subscriber profile 113 for wireless communication device 113 (201). Control network element 123 stores shared subscriber profile 110 for wireless communication devices 101-103 (202).

Control network element 123 determines when at least one of individual subscriber profiles 111 is unavailable from data storage network element 124 (203). When individual subscriber profile 111 is available from data storage network element 124 (203), wireless access node 121 and network elements 122-124 serve wireless communication device 101 based on individual subscriber profile 111 (204). When individual subscriber profile 111 is unavailable from data storage network element 124 (203), wireless access node 121 and network elements 122-124 serve wireless communication device 101 based on shared subscriber profile 110 (205). The operation for wireless communication device 101 repeats (203-205).

When individual subscriber profile 112 is available from data storage network element 124 (203), wireless access node 121 and network elements 122-124 serve wireless communication device 102 based on individual subscriber profile 112 (206). When individual subscriber profile 112 is unavailable from data storage network element 124 (203), wireless access node 121 and network elements 122-124 serve wireless communication device 102 based on shared subscriber profile 110 (207). The operation for wireless communication device 102 repeats (203, 206-207).

When individual subscriber profile 113 is available from data storage network element 124 (203), wireless access node 121 and network elements 122-124 serve wireless communication device 103 based on individual subscriber profile 113 (208). When individual subscriber profile 113 is unavailable from data storage network element 124 (203), wireless access node 121 and network elements 122-124 serve wireless communication device 103 based on shared subscriber profile 110 (209). The operation for wireless communication device 103 repeats (203, 208-209).

Figure 3:
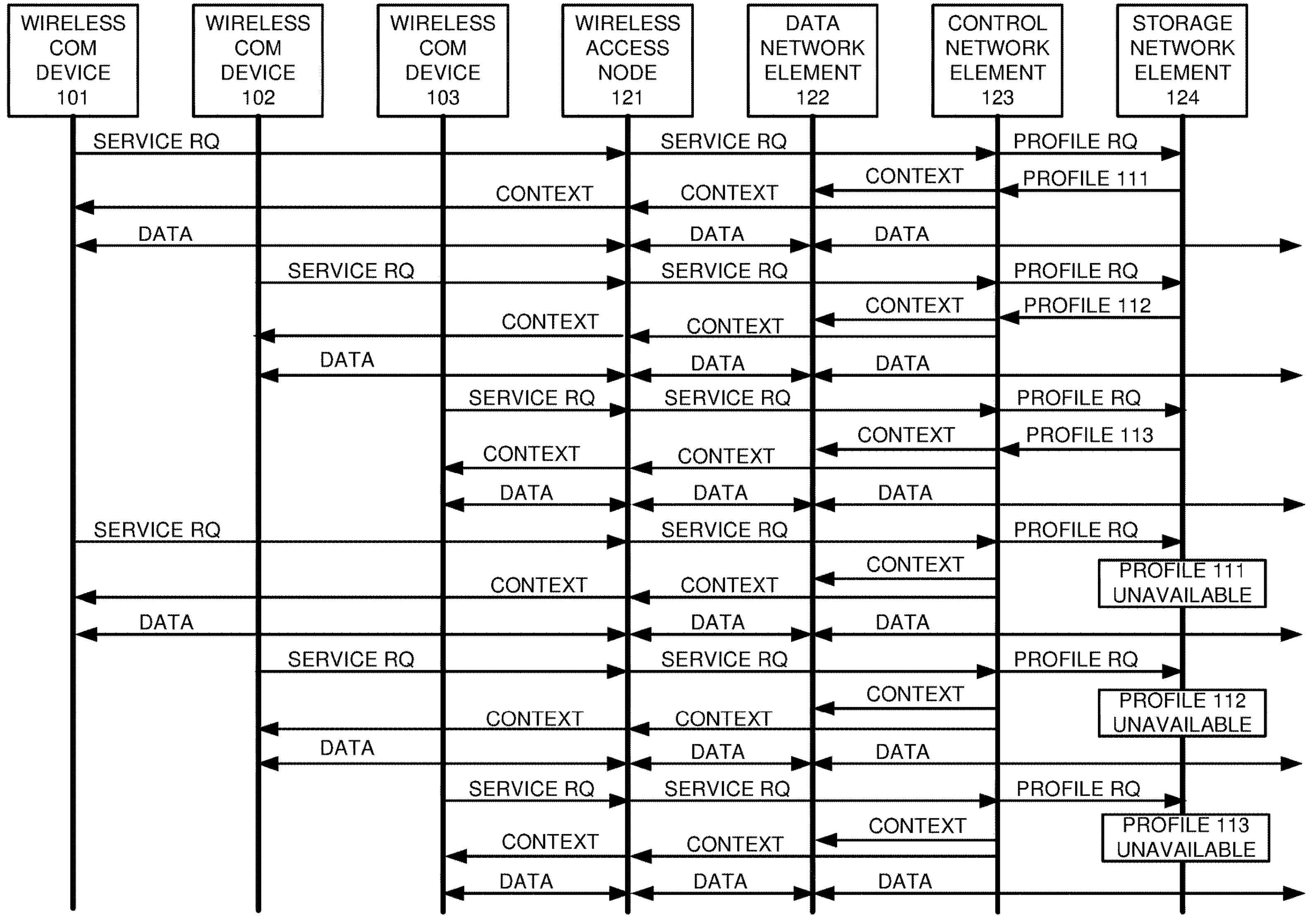
FIG. 3 illustrates an exemplary operation of the wireless communication system to serve wireless communication devices based on individual subscriber profiles and a shared subscriber profile.

FIG. 3 illustrates an exemplary operation of wireless communication system 100 to serve wireless communication devices 101-103 based on individual subscriber profiles 111-113 and shared subscriber profile 110. Prior to the operation depicted on FIG. 3, control network element 123 stores shared subscriber profile 110, and storage network element 124 stores individual subscriber profiles 111-113.

Wireless communication device 101 transfers a service request (RQ) to control network element 123 over wireless access node 121. Control network element 123 transfers a profile request (RQ) for wireless communication device 101 to storage network element 124, and in response, storage network element 124 transfers individual subscriber profile 111 for wireless communication device 101 to control network element 123. Individual subscriber profile 111 describes individual slices, network names, network types, radio technology, messaging, roaming, and authentication for wireless communication device 101. Control network element 123 determines individual context based on individual subscriber profile 111 and transfers the individual context to data network element 122, wireless access node 121, and wireless communication device 101. Based on the individual context from individual profile 111, wireless communication device 101 exchanges user data with external data systems (not shown) over wireless access node 121 and data network element 122.

Wireless communication device 102 transfers a service request to control network element 123 over wireless access node 121. Control network element 123 transfers a profile request for wireless communication device 102 to storage network element 124, and in response, storage network element 124 transfers individual subscriber profile 112 for wireless communication device 102 to control network element 123. Individual subscriber profile 112 describes individual slices, network names, network types, radio technology, messaging, roaming, and authentication for wireless communication device 102. Control network element 123 determines individual context based on individual subscriber profile 112 and transfers the individual context to data network element 122, wireless access node 121, and wireless communication device 102. Based on the individual context from individual profile 112, wireless communication device 102 exchanges user data with external data systems (not shown) over wireless access node 121 and data network element 122.

Wireless communication device 103 transfers a service request to control network element 123 over wireless access node 121. Control network element 123 transfers a profile request for wireless communication device 103 to storage network element 124, and in response, storage network element 124 transfers individual subscriber profile 113 for wireless communication device 103 to control network element 123. Individual subscriber profile 113 describes individual slices, network names, network types, radio technology, messaging, roaming, and authentication for wireless communication device 103. Control network element 123 determines individual context based on individual subscriber profile 113 and transfers the individual context to data network element 122, wireless access node 121, and wireless communication device 103. Based on the individual context from individual profile 113, wireless communication device 103 exchanges user data with external data systems (not shown) over wireless access node 121 and data network element 122.

Subsequently, wireless communication device 101 transfers a service request to control network element 123 over wireless access node 121. Control network element 123 transfers a profile request for wireless communication device 101 to storage network element 124, but storage network element 124 does not respond due to an overload or some other condition. In response to the unavailability of individual subscriber profile 111, control network element 123 uses shared subscriber profile 110 for wireless communication device 101. Shared subscriber profile 110 describes common slices, network names, network types, radio technology messaging, roaming, and authentication for wireless communication devices 101-103. Control network element 123 determines shared context based on shared subscriber profile 110 and transfers the shared context to data network element 122, wireless access node 121, and wireless communication device 101. Based on the shared context from shared profile 110, wireless communication device 101 exchanges user data with external data systems (not shown) over wireless access node 121 and data network element 122.

Subsequently, wireless communication device 102 transfers a service request to control network element 123 over wireless access node 121. Control network element 123 transfers a profile request for wireless communication device 102 to storage network element 124, but storage network element 124 does not respond due to data corruption or some other condition. In response to the unavailability of individual subscriber profile 112, control network element 123 uses shared subscriber profile 110 for wireless communication device 102. Shared subscriber profile 110 describes common slices, network names, network types, radio technology messaging, roaming, and authentication for wireless communication devices 101-103. Control network element 123 determines shared context based on shared subscriber profile 110 and transfers the shared context to data network element 122, wireless access node 121, and wireless communication device 102. Based on the shared context from shared profile 110, wireless communication device 102 exchanges user data with external data systems (not shown) over wireless access node 121 and data network element 122.

Subsequently, wireless communication device 103 transfers a service request to control network element 123 over wireless access node 121. Control network element 123 transfers a profile request for wireless communication device 103 to storage network element 124, but storage network element 124 does not respond due to network element error, or some other condition. In response to the unavailability of individual subscriber profile 113, control network element 123 uses shared subscriber profile 110 for wireless communication device 103. Shared subscriber profile 110 describes slices, network names, network types, radio technology, messaging, roaming, and authentication for wireless communication devices 101-103. In response, control network element 123 determines shared context based on shared subscriber profile 110 and transfers the shared context to data network element 122, wireless access node 121, and wireless communication device 103. Based on the shared context from shared profile 110, wireless communication device 103 exchanges user data with external data systems (not shown) over wireless access node 121 and data network element 122.

Advantageously, wireless communication system 100 efficiently handles the massive growth of subscribers and wireless data services that cause a massive growth in the amount of individual subscriber profiles—which can overload storage network element 124. Moreover, wireless communication system 100 effectively delivers the wireless data services to subscribers when their individual subscriber profiles are not served by faulty storage network element 124. Thus, wireless communication system 100 may provide 24*7 service availability to subscribers irrespective of network function issues. Wireless communication system 100 may help its network functions quickly recover from overload conditions without any new additional traffic.

Figure 4:
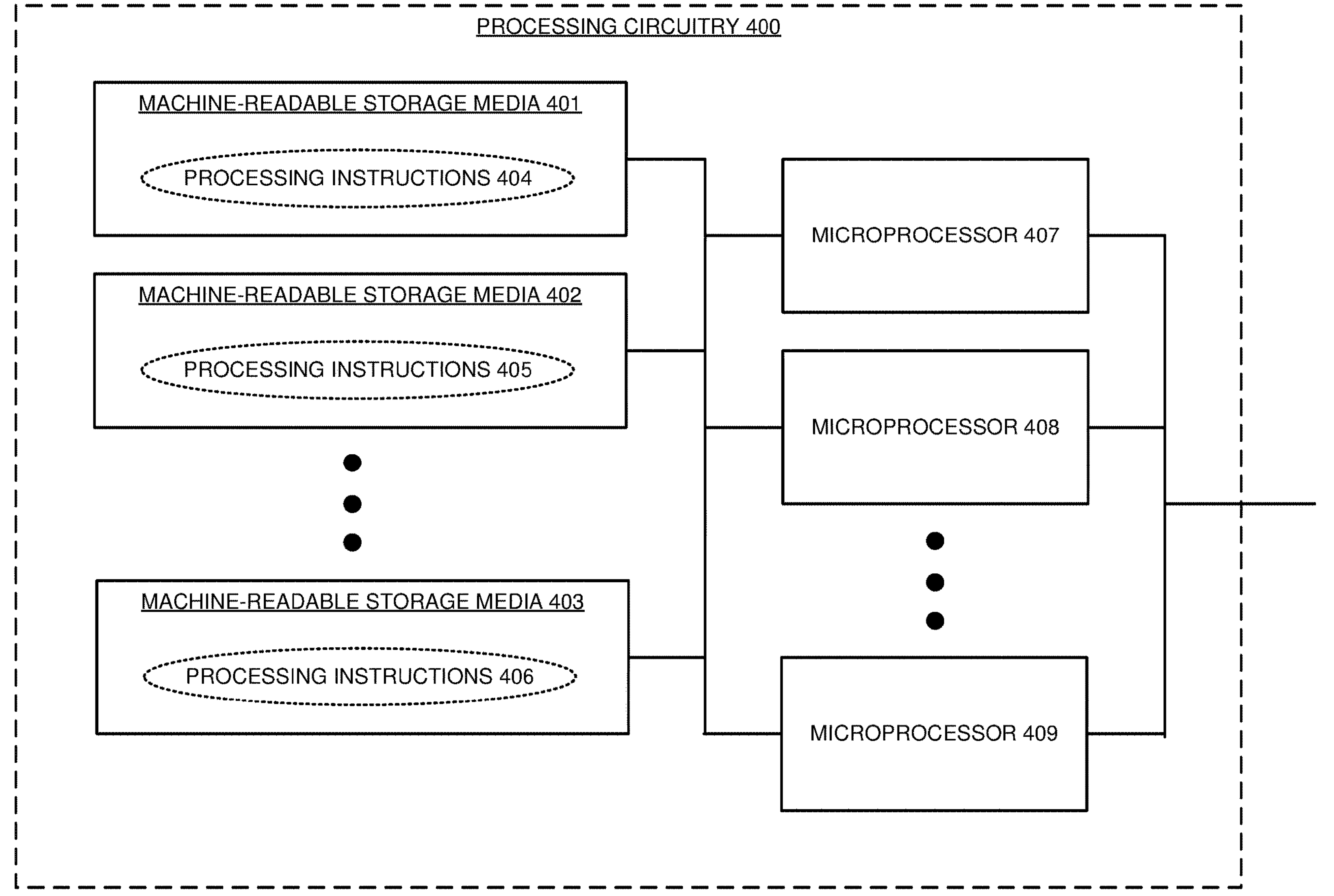
FIG. 4 illustrates exemplary processing circuitry to serve wireless communication devices based on individual subscriber profiles and a shared subscriber profile.

FIG. 4 illustrates exemplary processing circuitry 400 to serve wireless communication devices based on individual subscriber profiles and a shared subscriber profile. Processing circuitry 400 comprises an example of control network element 123 and storage network element 124, although network elements 123-124 may differ. Processing circuitry 400 comprises machine-readable storage media 401-403 and microprocessors 407-409 that are communicatively coupled. Machine-readable storage media 401-403 store processing instructions 404-406 in a non-transitory manner. Microprocessors 407-409 comprise DSPs, CPUs, GPUs, ASICs, and/or some other data processing hardware. Machine-readable storage media 401-403 comprises RAM, flash circuitry, disk drives, and/or some other type of data storage apparatus. Microprocessors 407-409 retrieve processing instructions 404-406 from non-transitory machine-readable storage media 401-403. Microprocessors 407-409 execute processing instructions 404-406 to serve wireless communication devices based on individual subscriber profiles and a shared subscriber profile as described above for wireless communication system 100 and as described below for wireless communication network 500. The amount of storage media, microprocessors, processing instructions that are shown in FIG. 4 is exemplary and may vary in other examples.

Figure 5:
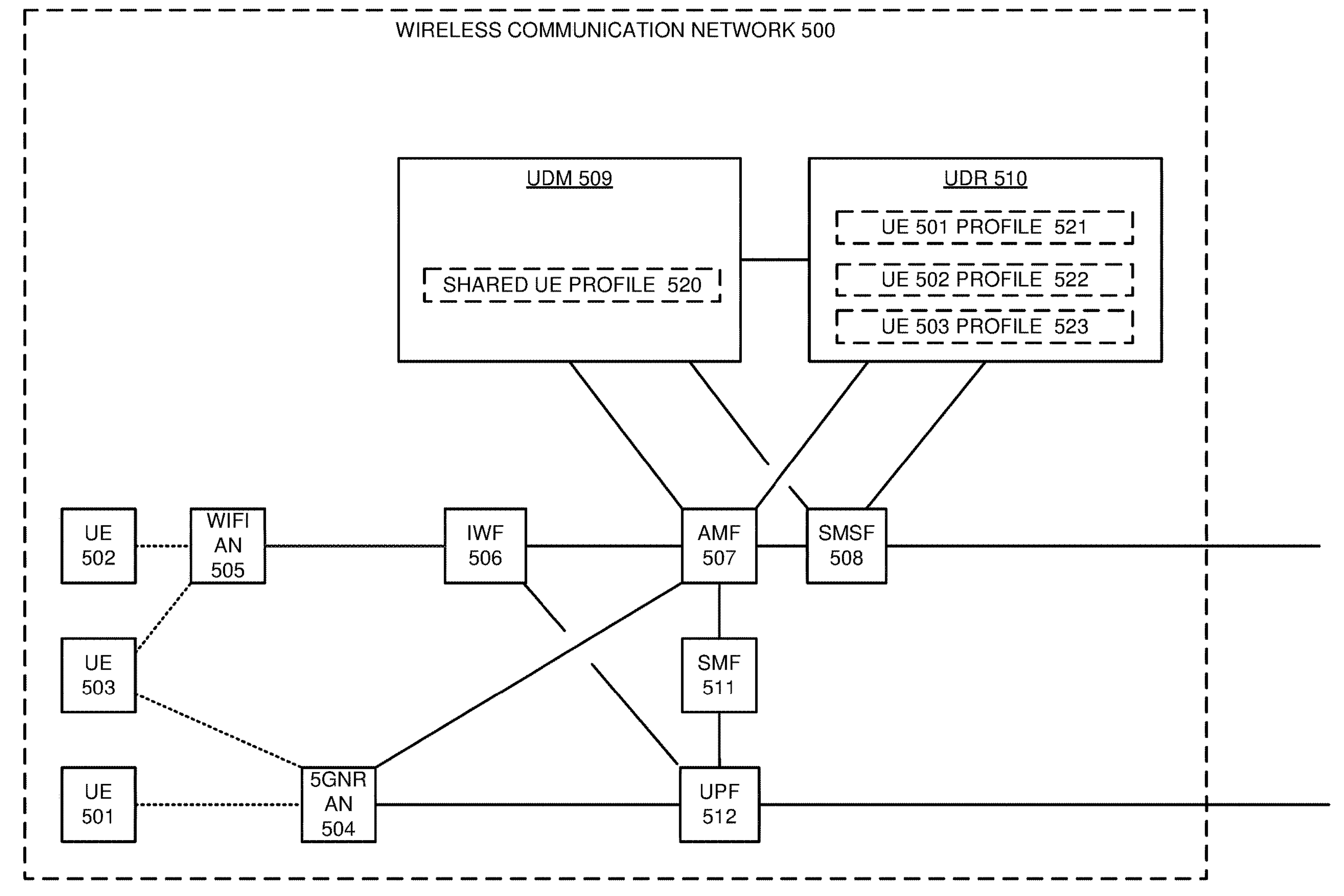
FIG. 5 illustrates an exemplary wireless communication network to serve User Equipment (UEs) based on individual subscriber profiles and a shared subscriber profile.

FIG. 5 illustrates exemplary wireless communication network 500 to serve User Equipment (UEs) 501-503 based on individual subscriber profiles 521-523 and shared subscriber profile 520. Wireless communication network 500 comprises an example of wireless communication system 100, although system 100 may differ. Wireless communication network 500 comprises UEs 501-503, Fifth Generation New Radio Access Node (5GNR AN) 504, WIFI AN 505, Non-Third Generation Partnership Project Interworking Function (IWF) 506, Access and Mobility Management Function (AMF) 507, Short Message Service Function (SMSF) 508, Unified Data Management (UDM) 509, Unified Data Repository (UDR) 510, Session Management Function (SMF) 511, and User Plane Function (UPF) 512.

UDM 509 stores shared UE profile 520 which can be lightweight (<10 kilobytes). UDR 510 stores UE 501 profile 521, UE 502 profile 522, and UE 503 profile 523. Updates to shared UE profile 520 are stored in UDR 510. UDM 509 periodically retrieves and caches a current version of shared UE profile 520 from UDR 510. For example, UDM 509 may have a configurable timer that triggers the retrieval of shared UE profile 520. Likewise, AMF 507 and SMSF 508 periodically retrieve and cache a current version of shared UE profile 520 from UDR 510. For example, AMF 507 and SMSF 508 may have configurable timers that trigger the retrieval of shared UE profile 520. AMF 507, SMSF 508, and UDM 509 only use shared UE profile 520 for subscribers that were already authenticated by an AUSF (not shown). The AUSF does not use shared UE profile 520.

UE 501 transfers a service request to AMF 507 over 5GNR AN 504. In response to the service request, AMF 507 requests UE 501 profile 521 from UDM 509. UDM 509 requests UE 501 profile 521 from UDR 510. UDR 510 transfers UE 501 profile 521 to UDM 509, and UDM 509 transfers UE 501 profile 521 to AMF 507. UE 501 profile 521 indicates Network Slice Selection Assistance Information (NSSAIs), Dynamic Network Names (DNNs) and their Quality-of-Service (QOS) levels, Short Message Service (SMS) attributes, roaming attributes, Radio Access Technology (RAT) types, and authentication mode. The DNNs are used to select SMFs (represented by SMF 511) for internet-access, voice-calling, messaging service, emergency communications, satellite uplink/downlink, augmented reality, virtual reality, and/or some other network communications product. AMF 507 and SMF 511 interact to develop UE context like network addresses and to select UPFs (represented by UPF 512). AMF 507 transfers some of the UE context to 5GNR AN 504. AMF 507 transfers some of the UE context to UE 501 over 5GNR AN 504. SMF 511 transfers some of the UE context to selected UPF 512. UE 501 then exchanges user data with external data systems (not shown) over 5GNR AN 504 and UPF 512 based on the UE context.

UE 502 transfers a service request to AMF 507 over WIFI AN 505 and IWF 506. In response to the service request, AMF 507 requests UE 502 profile 522 from UDM 509. UDM 509 requests UE 502 profile 522 from UDR 510. UDR 510 transfers UE 502 profile 522 to UDM 509, and UDM 509 transfers UE 502 profile 522 to AMF 507. UE 501 profile 522 indicates NSSAIs, DNNs and their QoS levels, SMS attributes, roaming attributes, RAT types, and authentication mode. The DNNs are used to select SMFs (represented by SMF 511) for internet-access, voice-calling, SMS, emergency communications, satellite uplink/downlink, augmented reality, virtual reality, and/or some other network communications product. AMF 507 and SMF 511 interact to develop UE context like network addresses and to select UPFs (represented by UPF 512). AMF 507 transfers some of the UE context to IWF 506. AMF 507 transfers some of the UE context to UE 502 over IWF 506 and WIFI AN 505. SMF 511 transfers some of the UE context to selected UPF 512. UE 502 then exchanges user data with external data systems (not shown) over WIFI AN 505, IWF 506, and UPF 512 based on the UE context.

UE 503 transfers a service request to AMF 507 over 5GNR AN 504 or WIFI AN 505-IWF 506. UE 503 exchanges user data over UPF 512 in a similar manner as that described above for UEs 501-502. The data exchange by UE 503 is controlled by UE context that is based on UE 503 profile 523.

Subsequently, UE 501 transfers a service request to AMF 507 over 5GNR AN 504. In response to the service request, AMF 507 requests UE 501 profile 521 from UDM 509. UDM 509 requests UE 501 profile 521 from UDR 510, but UDR 510 is not reachable, has a database time-out, or responds with ambiguous errors. In response to the failure of UDR 510, UDM 509 uses shared UE profile 520. Shared UE profile 520 indicates NSSAIs, DNNs and their QoS levels, SMS attributes, roaming attributes, RAT types, and authentication mode. The DNNs are used to select SMFs (represented by SMF 511) for internet-access, voice-calling, SMS, emergency communications, satellite uplink/downlink, augmented reality, virtual reality, and/or some other network communications product. AMF 507 and SMF 511 interact to develop UE context like network addresses and to select UPFs (represented by UPF 512). AMF 507 transfers some of the UE context to 5GNR AN 504. AMF 507 transfers some of the UE context to UE 501 over 5GNR AN 504. SMF 511 transfers some of the UE context to selected UPF 512. UE 501 then exchanges user data with external data systems (not shown) over 5GNR AN 504 and UPF 512 based on the UE context.

Subsequently, UE 502 transfers a service request to AMF 507 over WIFI AN 505 and IWF 506. In response to the service request, AMF 507 requests UE 502 profile 522 from UDM 509. UDM 509 requests UE 502 profile 522 from UDR 510, but UDR 510 is not reachable, has a database time-out, or responds with ambiguous errors. In response to the failure of UDR 510, UDM 509 uses shared UE profile 520. Shared UE profile 520 indicates NSSAIs, DNNs and their QoS levels, SMS attributes, roaming attributes, RAT types, and authentication mode. The DNNs are used to select SMFs (represented by SMF 511) for internet-access, voice-calling, SMS, emergency communications, satellite uplink/downlink, augmented reality, virtual reality, and/or some other network communications product. AMF 507 and SMF 511 interact to develop UE context like network addresses and to select UPFs (represented by UPF 512). AMF 507 transfers some of the UE context to IWF 506. AMF 507 transfers some of the UE context to UE 502 over IWF 506 and WIFI AN 505. SMF 511 transfers some of the UE context to selected UPF 512. UE 502 then exchanges user data with external data systems (not shown) over WIFI AN 505, IWF 506, and UPF 512 based on the UE context.

Subsequently, UE 503 transfers a service request to AMF 507 over 5GNR AN 504 or WIFI AN 505-IWF 506. UE 503 exchanges user data over UPF 512 in a similar manner to that described above for UEs 501-502. Since UDR 510 is still not reachable, has a database time-out, or responds with ambiguous errors, the data exchange by UE 503 is controlled by UE context that is based on shared UE profile 520 as described above for UEs 501-502.

AMF 507 periodically retrieves the current version of shared UE profile 520 from UDR 510 or UDM 509. When UDM 509 is not reachable, has a database time-out, or responds with ambiguous errors for one or more of requested UE profiles 520-523, AMF 507 uses its copy of shared UE profile 520 to deliver data communication services to UEs 501-503. For example, AMF 507 may select SMF 511 based on an internet-access DNN in shared UE profile 520.

SMSF 408 periodically retrieves the current version of shared UE profile 520 from UDR 510 or UDM 509. When UDM 509 is not reachable, has a database time-out, or responds with ambiguous for one or more of requested UE profiles 520-523, SMSF 508 uses its copy of shared UE profile 520 to provide SMS to UEs 501-503. For example, SMSF 520 might use a shared message center ID and a shared message service version that is indicated by shared UE profile 520.

Figure 6:
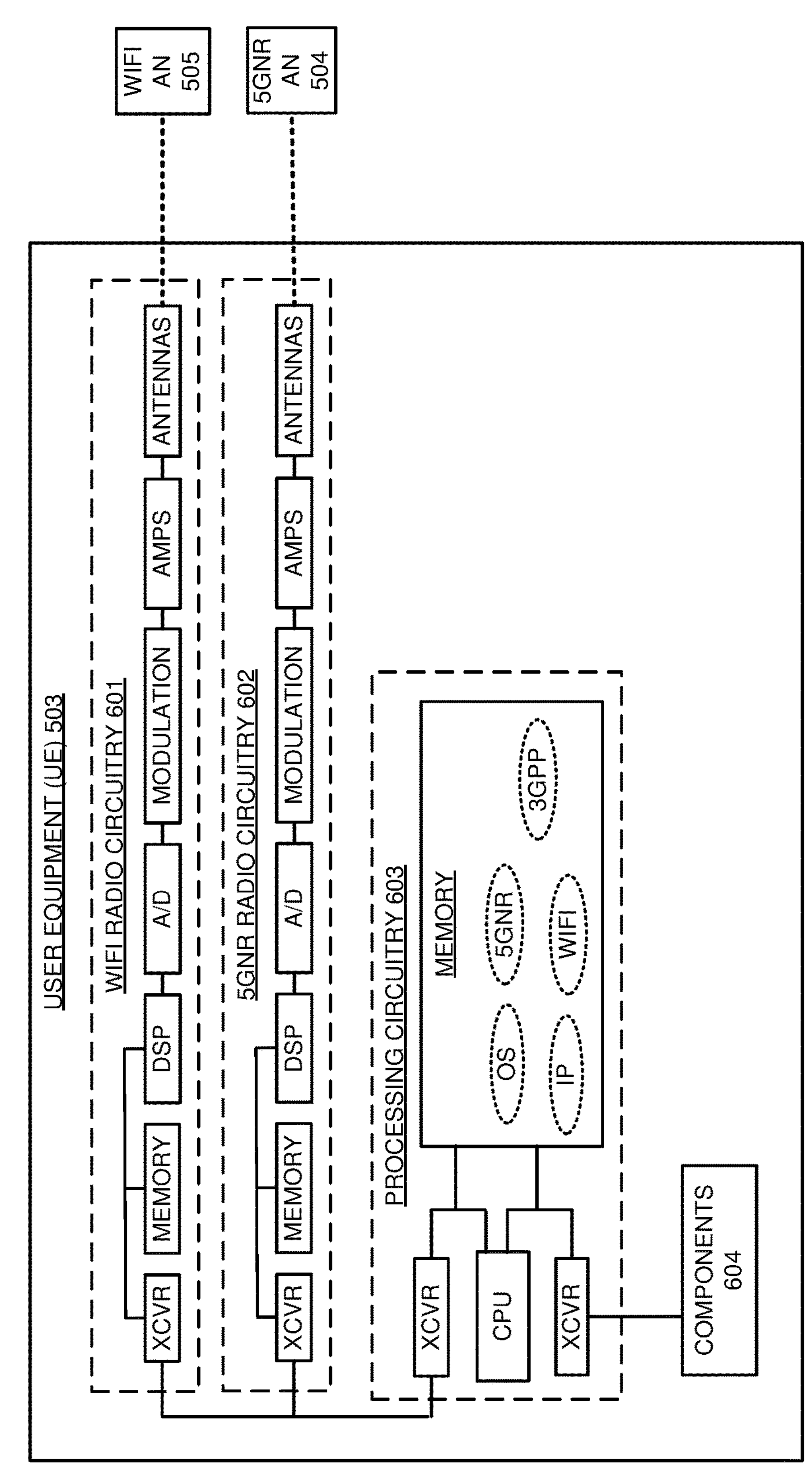
FIG. 6 illustrates an exemplary User Equipment (UE) in the wireless communication network to serve UEs based on individual subscriber profiles and a shared subscriber profile.

FIG. 6 illustrates exemplary UE 503 in wireless communication network 500 to serve UE 503 based on individual subscriber profiles 521-523 and shared subscriber profile 520. UE 503 comprises an example of wireless communication devices 101-103 and UEs 501-502, although devices 101-103 and UEs 501-502 may differ. UE 503 comprises WIFI radio circuitry 601, 5GNR radio circuitry 602, processing circuitry 603, and components 604. Components 604 comprise sensors, cameras, medical devices, and/or some other user apparatus. Radios 601-602 comprise antennas, amplifiers, filters, modulation, analog-to-digital interfaces, DSPs, memories, and transceivers (XCVRs) that are coupled over bus circuitry. Processing circuitry 603 comprises one or more CPUs, one or more memories, and one or more transceivers that are coupled over bus circuitry. The one or more memories in processing circuitry 603 store software like an Operating System (OS), 5GNR application (5GNR), 3GPP application (3GPP), Internet Protocol application (IP), and WIFI application (WIFI). The antennas in WIFI radio circuitry 601 exchange WIFI signals with WIFI AN 505. The antennas in 5GNR radio circuitry 602 exchange 5GNR signals with 5GNR AN 504. Transceivers in radios 601-602 are coupled to transceivers in processing circuitry 603. In processing circuitry 603, the one or more CPUs retrieve the software from the one or more memories and execute the software to direct the operation of UE 503 as described herein. In particular, UE 503 receives wireless data services based on UE 503 profile 523 when it is available and receives wireless data services based on shared profile 520 when individual profile 523 is not available.

Figure 7:
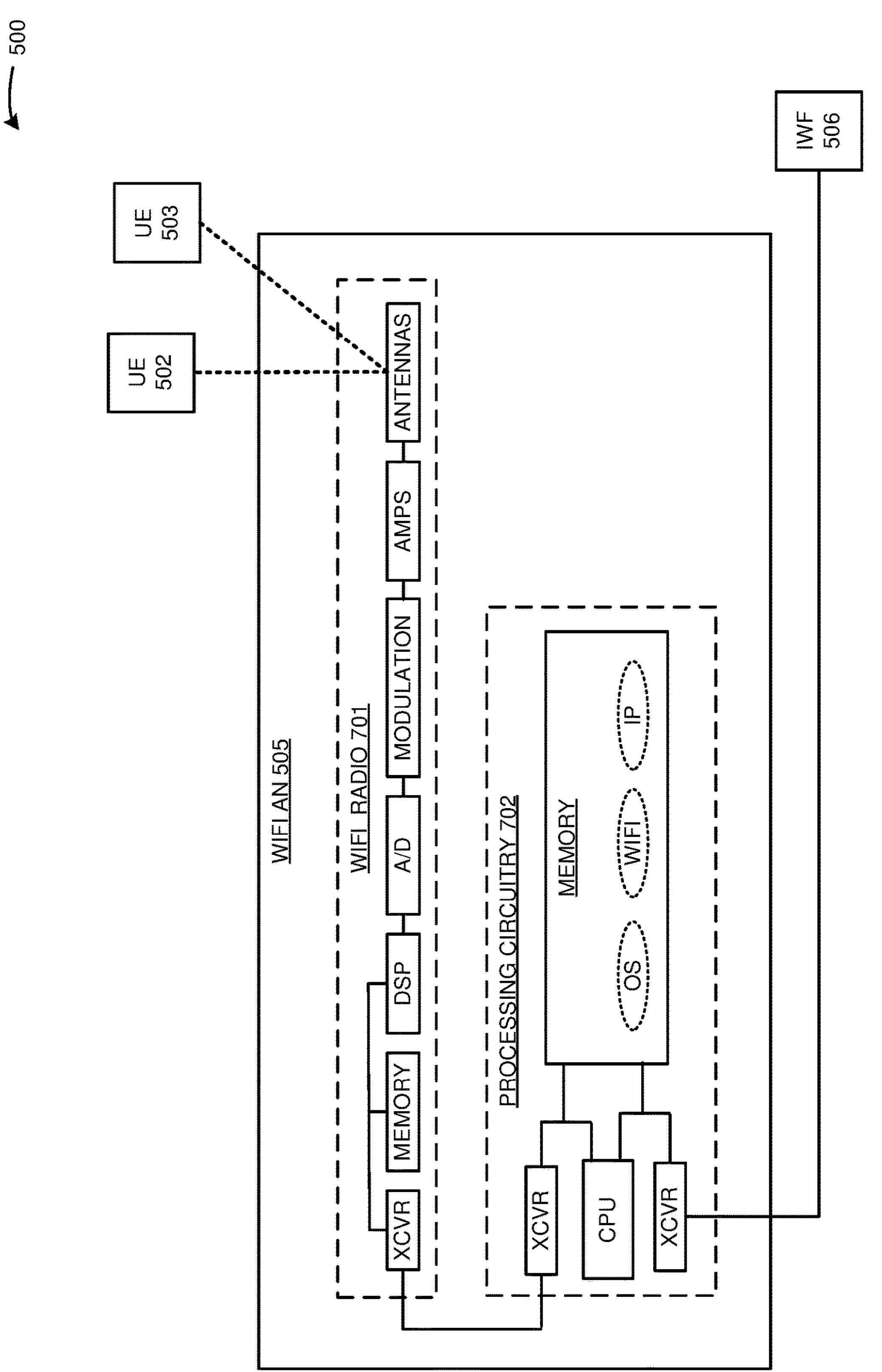
FIG. 7 illustrates an exemplary WIFI access node in the wireless communication network to serve UEs based on individual subscriber profiles and a shared subscriber profile.

FIG. 7 illustrates exemplary Wireless Fidelity (WIFI) Access Node (AN) 505 in wireless communication network 500 to serve UEs 502-503 based on individual subscriber profiles 522-523 and shared subscriber profile 520. WIFI AN 505 comprises an example of wireless access node 121, although node 121 may differ. WIFI AN 505 comprises WIFI radio 701 and processing circuitry 702. Radio 701 comprises antennas, amplifiers, filters, modulation, analog-to-digital interfaces, DSPs, memories, and transceivers that are coupled over bus circuitry. Processing circuitry 702 comprises one or more CPUs, one or more memories, and one or more transceivers that are coupled over bus circuitry. The one or more memories in processing circuitry 702 store software like an Operating System, WIFI application, and IP application. The antennas in WIFI radio 701 exchange WIFI signals with UEs 502-503. Transceivers in radio 701 are coupled to transceivers in processing circuitry 702. Transceivers in processing circuitry 702 are coupled to transceivers in IWF 506. In processing circuitry 702, the one or more CPUs retrieve the software from the one or more memories and execute the software to direct the operation of WIFI AN 505 as described herein. In particular, WIFI AN 505 serves UEs 502-503 based on individual profiles 522-523 when they are available and delivers wireless data services based on shared profile 520 when individual profiles 522-523 are not available.

Figure 8:
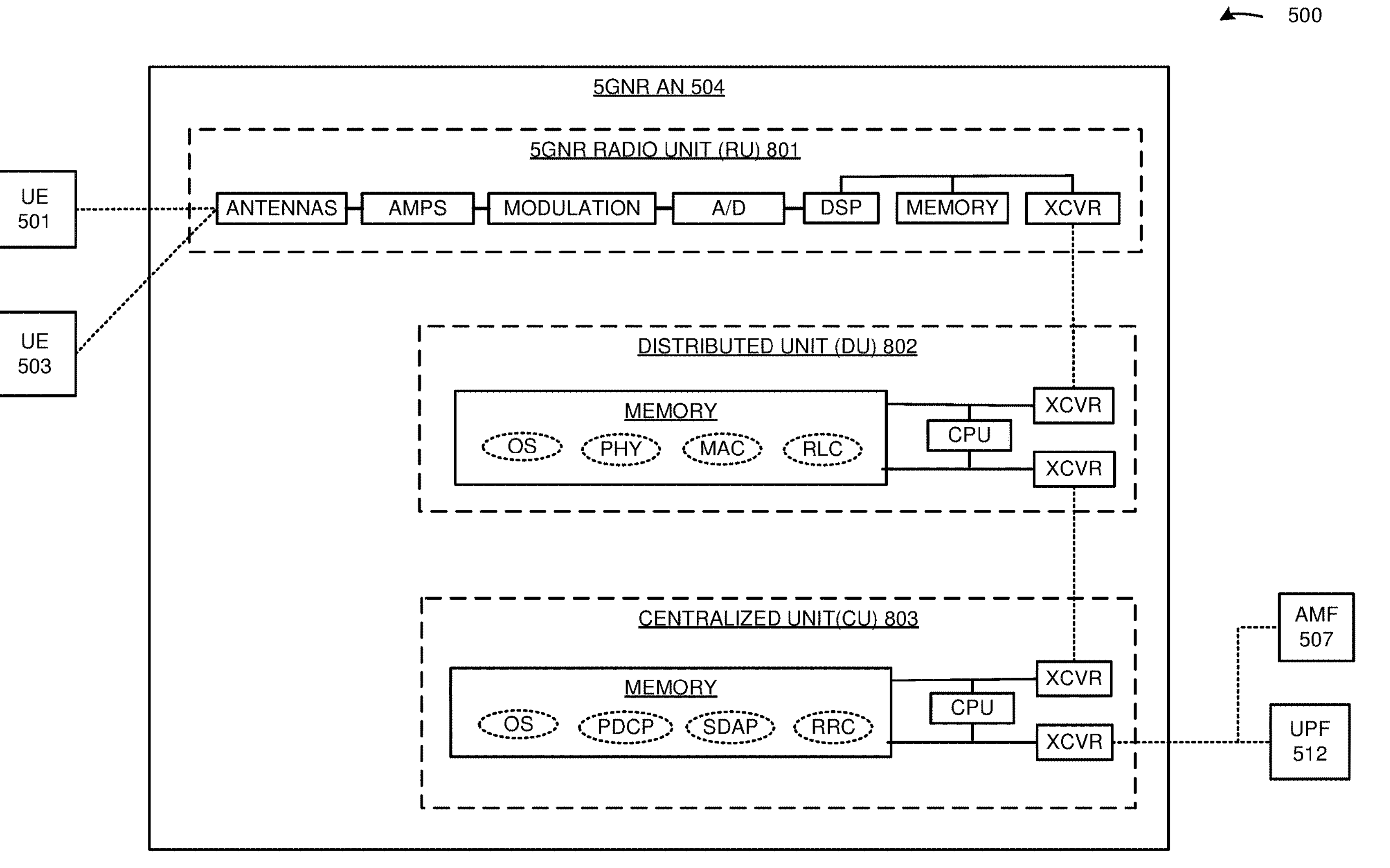
FIG. 8 illustrates an exemplary Fifth Generation New Radio (5GNR) access node in the wireless communication network to serve UEs based on individual subscriber profiles and a shared subscriber profile.

FIG. 8 illustrates an exemplary Fifth Generation New Radio (5GNR) Access Node (AN) 504 wireless communication network 500 to serve UEs 501 and 503 based on individual subscriber profiles 521 and 523 and shared subscriber profile 520. 5GNR AN 504 comprises an example of wireless access node 121, although node 121 may differ. 5GNR AN 504 comprises 5GNR Radio Unit (RU) 801, Distributed Unit (DU) 802, and Centralized Unit (CU) 803. 5GNR RU 801 comprises antennas, amplifiers, filters, modulation, analog-to-digital interfaces, DSP, memory, radio applications, and transceivers that are coupled over bus circuitry. DU 802 comprises memory, CPU, user interfaces and components, and transceivers that are coupled over bus circuitry. The memory in DU 802 stores operating system and 5GNR network applications for Physical Layer (PHY), Media Access Control (MAC), and Radio Link Control (RLC). CU 803 comprises memory, CPU, and transceivers that are coupled over bus circuitry. The memory in CU 803 stores an operating system and 5GNR network applications for Packet Data Convergence Protocol (PDCP), Service Data Adaption Protocol (SDAP), and Radio Resource Control (RRC). The antennas in 5GNR RU 801 are wirelessly coupled to UE 501 and UE 503 over 5GNR links. Transceivers in 5GNR RU 801 are coupled to transceivers in DU 802. Transceivers in DU 802 are coupled to transceivers in CU 803. Transceivers in CU 803 are coupled to AMF 507 and UPF 512. The DSP and CPU in RU 701, DU 702, and CU 703 execute the radio applications, operating systems, and network applications to exchange data and signaling with UE 501, UE 503, AMF 507, and UPF 512 as described herein. In particular, 5GNR AN 504 serves UEs 501 and 503 based on individual profiles 521 and 523 when they are available and delivers wireless data services based on shared profile 520 when individual profiles 521 and 523 are not available.

Figure 9:
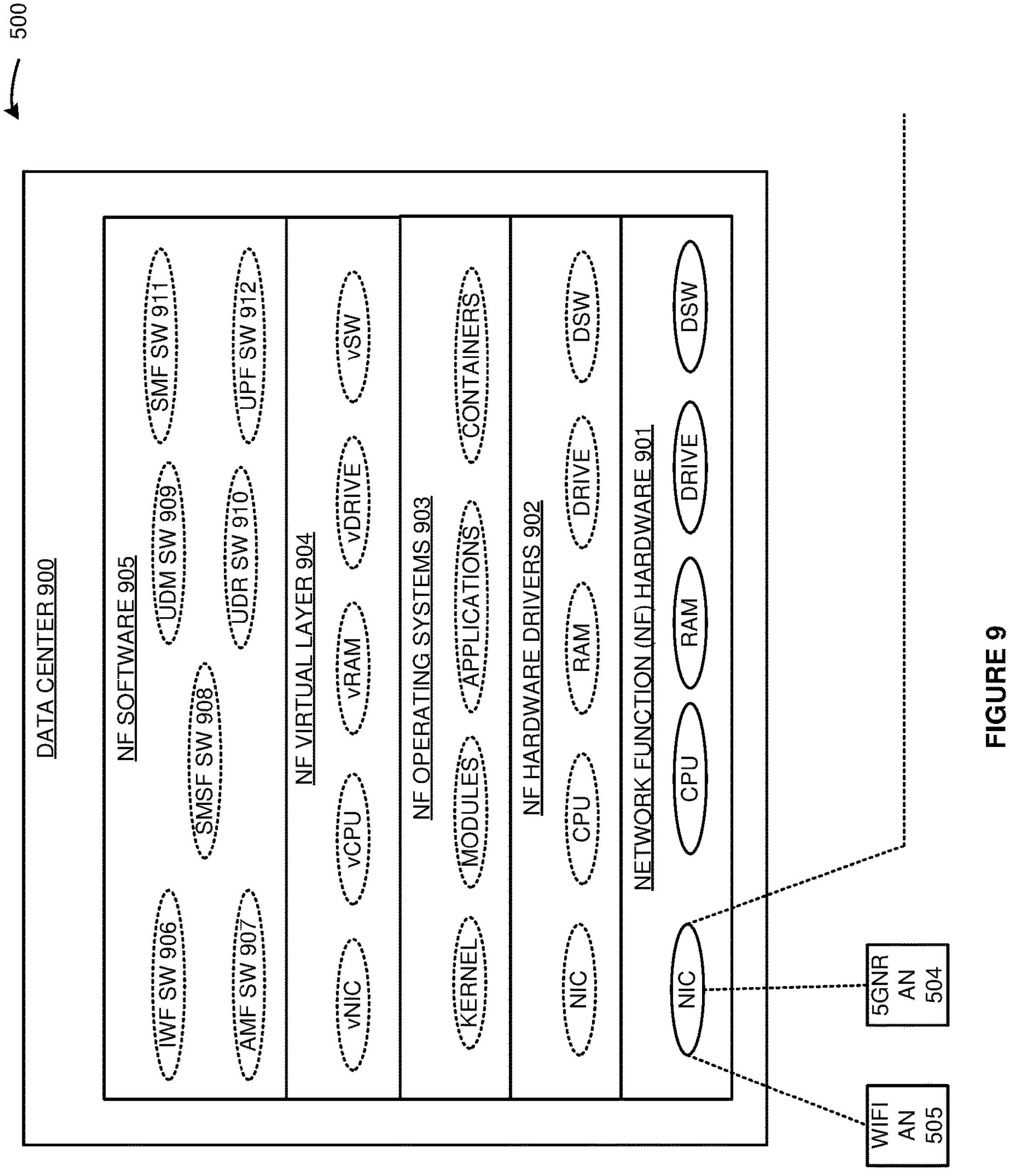
FIG. 9 illustrates an exemplary data center in the wireless communication network to serve UEs based on individual subscriber profiles and a shared subscriber profile.

FIG. 9 illustrates exemplary data center 900 in wireless communication network 500 to serve UEs 501-503 based on individual subscriber profiles 521-523 and shared subscriber profile 520. Data center 900 comprises an example of network elements 122-124 and circuitry 400, although elements 122-124 and circuitry 400 may differ. Data center 900 comprises NF hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, applications, and containers. NF virtual layer 904 comprises vNIC, vCPU, vRAM, vDRIVE, and vSW. NF SW 905 comprises IWF SW 906, AMF SW 907, SMSF SW 908, UDM SW 909, UDR SW 910, SMF SW 911, and UPF SW 912. The NIC in NF hardware 901 are coupled to 5GNR AN 504, WIFI AN 505, and external systems. NF hardware 901 executes NF hardware drivers 902, NF operating systems 903, NF virtual layer 904, and NF SW 905 to form and operate IWF 506, AMF 507, SMSF 508, UDM 509, UDR 510, SMF 511, and UPF 512. Thus, data center 900 comprises one or more microprocessors and one or more non-transitory machine-readable storage media that store processing instructions that direct data center 900 to perform the methods described herein. Network data center 900 may be located at a single site or be distributed across multiple geographic locations.

In particular, UDM SW 909 stores shared UE profile 520. UDR SW 910 stores UE 501 profile 521, UE 502 profile 522, and UE 503 profile 523. Updates to shared UE profile 520 are stored in UDR SW 910. UDM SW 909 periodically retrieves a current version of shared UE profile 520 from UDR SW 910. AMF SW 507 and SMSF SW 508 periodically retrieve a current version of shared UE profile 520 from UDR SW 910.

UE 501 transfers a service request to AMF SW 907 over 5GNR AN 504. In response to the service request, AMF SW 907 requests UE 501 profile 521 from UDM SW 909. UDM SW 909 requests UE 501 profile 521 from UDR SW 910. UDR SW 910 transfers UE 501 profile 521 to UDM SW 909, and UDM SW 909 transfers UE 501 profile 521 to AMF SW 907. UE 501 profile 521 indicates NSSAIs, DNNs and their QoS levels, SMS attributes, roaming attributes, RAT types, and authentication mode. The DNNs are used to select SMF SW like SMF SW 911 for internet-access, voice-calling, messaging service, emergency communications, satellite uplink/downlink, augmented reality, virtual reality, and/or some other network communications product. AMF SW 907 and SMF SW 911 interact to develop UE context like network addresses and to select UPF SW like UPF SW 912. AMF SW 907 transfers some of the UE context to 5GNR AN 504. AMF SW 907 transfers some of the UE context to UE 501 over 5GNR AN 504. SMF SW 911 transfers some of the UE context to selected UPF SW 912. UE 501 then exchanges user data with external data systems (not shown) over 5GNR AN 504 and UPF SW 912 based on the context.

UE 502 transfers a service request to AMF SW 907 over WIFI AN 505 and IWF SW 906. In response to the service request, AMF SW 907 requests UE 502 profile 522 from UDM SW 909. UDM SW 909 requests UE 502 profile 522 from UDR SW 910. UDR SW 910 transfers UE 502 profile 522 to UDM SW 909, and UDM SW 909 transfers UE 502 profile 522 to AMF SW 907. UE 501 profile 522 indicates NSSAIs, DNNs and their QoS levels, SMS attributes, roaming attributes, RAT types, and authentication mode. The DNNs are used to select SMF SW like SMF SW 911 for internet-access, voice-calling, SMS, emergency communications, satellite uplink/downlink, augmented reality, virtual reality, and/or some other network communications product. AMF SW 907 and SMF SW 911 interact to develop UE context like network addresses and to select UPF SW like UPF SW 912. AMF SW 907 transfers some of the UE context to IWF SW 906. AMF SW 907 transfers some of the UE context to UE 502 over IWF SW 906 and WIFI AN 505. SMF SW 911 transfers some of the UE context to selected UPF SW 912. UE 502 then exchanges user data with external data systems (not shown) over WIFI AN 505, IWF SW 906, and UPF SW 912 based on the UE context.

UE 503 transfers a service request to AMF SW 907 over 5GNR AN 504 or WIFI AN 505-IWF SW 906. UE 503 exchanges user data over UPF SW 912 as described above for UEs 501-502. The data exchange by UE 503 is controlled by UE context that is based on individual UE 503 profile 523.

Subsequently, UE 501 transfers a service request to AMF SW 907 over 5GNR AN 504. In response to the service request, AMF SW 907 requests UE 501 profile 521 from UDM SW 909. UDM SW 909 requests UE 501 profile 521 from UDR SW 910, but UDR SW 910 does not respond due to an overload or some other condition. In response to the failure of UDR SW 910, UDM SW 909 uses shared UE profile 520. Shared UE profile 520 indicates NSSAIs, DNNs and their QoS levels, SMS attributes, roaming attributes, RAT types, and authentication mode. The DNNs are used to select SMF SW like SMF SW 911 for internet-access, voice-calling, SMS, emergency communications, satellite uplink/downlink, augmented reality, virtual reality, and/or some other network communications product. AMF SW 907 and SMF SW 911 interact to develop UE context like network addresses and to select UPF SW like UPF SW 912. AMF SW 907 transfers some of the UE context to 5GNR AN 504. AMF SW 907 transfers some of the UE context to UE 501 over 5GNR AN 504. SMF SW 911 transfers some of the context to selected UPF SW 912. UE 501 then exchanges user data with external data systems (not shown) over 5GNR AN 504 and UPF SW 912 based on the context.

Subsequently, UE 502 transfers a service request to AMF SW 907 over WIFI AN 505 and IWF SW 906. In response to the service request, AMF SW 907 requests UE 502 profile 522 from UDM SW 909. UDM SW 909 requests UE 502 profile 522 from UDR SW 910, but UDR SW 910 does not respond due to an error or some other condition. In response to the failure of UDR SW 910, UDM SW 909 uses shared UE profile 520. Shared UE profile 520 indicates NSSAIs, DNNs and their QoS levels, SMS attributes, roaming attributes, RAT types, and authentication mode. The DNNs are used to select SMF SW like SMF SW 911 for internet-access, voice-calling, SMS, emergency communications, satellite uplink/downlink, augmented reality, virtual reality, and/or some other network communications product. AMF SW 907 and SMF SW 911 interact to develop UE context like network addresses and to select UPF SW like UPF SW 912. AMF SW 907 transfers some of the UE context to IWF SW 906. AMF SW 907 transfers some of the UE context to UE 502 over IWF SW 906 and WIFI AN 505. SMF SW 911 transfers some of the UE context to selected UPF SW 912. UE 502 then exchanges user data with external data systems (not shown) over WIFI AN 505, IWF SW 906, and UPF SW 912 based on the UE context.

Subsequently, UE 503 transfers a service request to AMF SW 907 over 5GNR AN 504 or WIFI AN 505-IWF SW 906. UE 503 exchanges user data over UPF SW 912 as described above for UEs 501-UE 502. Since UDR SW 910 is still not responding to UDM SW 909, the data exchange by UE 503 is controlled by common context that is based on shared UE profile 520 as described above for UEs 501-UE 502.

AMF SW 907 periodically retrieves the current version of shared UE profile 520 from UDR SW 910 or UDM SW 909. When UDM SW 909 does not respond to AMF SW 907 with one or more of requested UE profiles 521-523, AMF SW 907 uses its copy of shared UE profile 520 to deliver data communication services to UEs 501-503. For example, AMF SW 907 may select SMF SW based on the DNNs in shared UE profile 520.

SMSF SW 508 periodically retrieves the current version of shared UE profile 520 from UDR SW 910 or UDM SW 909. When UDM SW 909 does not respond to SMSF SW 908 with one or more of requested UE profiles 521-523, SMSF SW 908 uses its copy of shared UE profile 520 to provide SMS to UEs 501-503. For example, SMSF SW 908 might use a shared message center ID that is indicated by shared UE profile 520.

Figure 10:
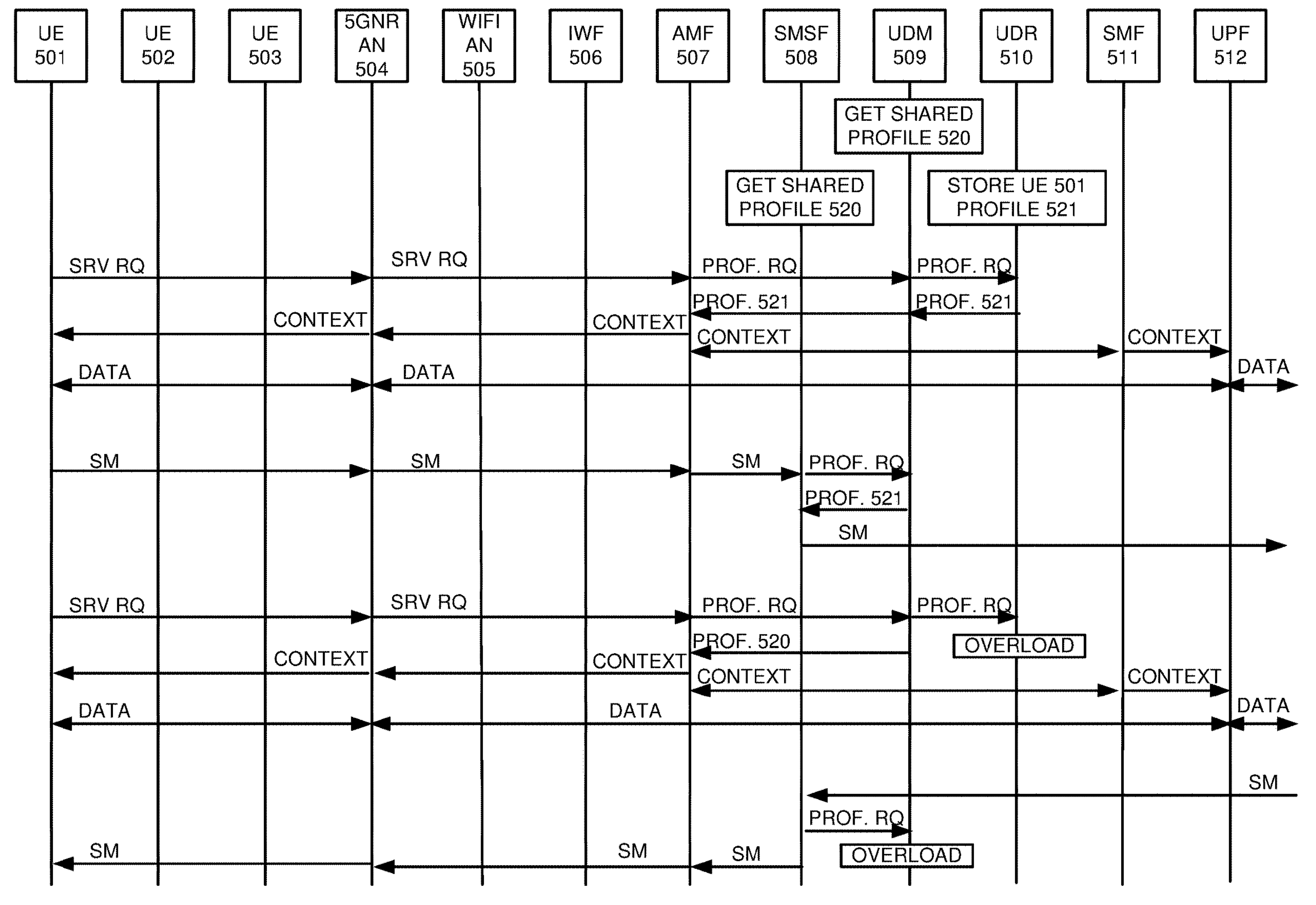
FIG. 10 illustrates an exemplary operation of the wireless communication network to serve UEs based on individual subscriber profiles and a shared subscriber profile.

FIG. 10 illustrates an exemplary operation of wireless communication network 500 to serve UE 501 based on individual subscriber profile 521 and shared subscriber profile 520. The operation may vary in other examples. UDM 509 and SMSF 508 get shared UE profile 520—typically from UDR 510. UDR 510 stores UE 501 profile 521.

UE 501 transfers a service request to AMF 507 over 5GNR AN 504. In response to the service request, AMF 507 requests UE 501 profile 521 from UDM 509. UDM 509 requests UE 501 profile 521 from UDR 510 (PROF. RQ). UDR 510 transfers UE 501 profile 521 to UDM 509, and UDM 509 transfers UE 501 profile 521 to AMF 507. UE 501 profile 521 indicates NSSAIs, DNNs and their QoS levels, SMS attributes, roaming attributes, RAT types, and authentication mode. The DNNs are used to select SMFs like SMF 511 for internet-access, voice-calling, messaging service, emergency communications, satellite uplink/downlink, augmented reality, virtual reality, and/or some other network communications product. AMF 507 and SMF 511 interact to develop UE context like network addresses and to select UPFs like UPF 512. AMF 507 transfers some of the UE context to 5GNR AN 504. AMF 507 transfers some of the UE context to UE 501 over 5GNR AN 504. SMF 511 transfers some of the UE context to selected UPF 512. UE 501 then exchanges user data with external data systems (not shown) over 5GNR AN 504 and UPF 512 based on the UE context.

UE 501 transfers a Short Message Service (SMS) message (SM) to SMSF 508 over 5GNR AN 504 and AMF 507. SMSF 508 retrieves UE 501 profile 521 from UDM 509-which previously retrieved UE 501 profile 521 from UDR 510. Based on UE 501 profile 521, SMSF 508 forwards the SMS message to an SMS center (not shown) for SM delivery.

Subsequently, UE 501 transfers a service request to AMF 507 over 5GNR AN 504. In response to the service request, AMF 507 requests UE 501 profile 521 from UDM 509. UDM 509 requests UE 501 profile 521 from UDR 510, but UDR 510 does not respond due to data corruption or some other condition. In response to the failure of UDR 510, UDM 509 uses shared UE profile 520. Shared UE profile 520 indicates NSSAIs, DNNs and their QoS levels, SMS attributes, roaming attributes, RAT types, and authentication mode. The DNNs are used to select SMFs like SMF 511 for internet-access, voice-calling, SMS, emergency communications, satellite uplink/downlink, augmented reality, virtual reality, and/or some other network communications product. AMF 507 and SMF 511 interact to develop UE context like network addresses and to select UPFs like UPF 512. AMF 507 transfers some of the UE context to 5GNR AN 504. AMF 507 transfers some of the UE context to UE 501 over 5GNR AN 504. SMF 511 transfers some of the UE context to selected UPF 512. UE 501 then exchanges user data with external data systems (not shown) over 5GNR AN 504 and UPF 512 based on the UE context.

Subsequently, SMSF 508 receives an SMS message for delivery to UE 501. SMSF 508 attempts to retrieve UE 501 profile 521 from UDM 509, but UDM does not response due to an error or some other cause. In response to the failure of UDR 510, SMSF 508 uses shared UE profile 520. Based on shared UE profile 520, SMSF 508 forwards the SMS message to UE 501 over AMF 507 and 5GNR AN 504.

FIG. 11 illustrates an exemplary operation of wireless communication network 500 to serve UE 502 based on individual subscriber profile 512 and shared subscriber profile 510. The operation may vary in other examples. UDM 509 and AMF 507 get shared UE profile 520-typically from UDR 510. UDR 510 stores UE 502 profile 522.

UE 502 transfers a service request to AMF 507 over WIFI AN 505 and IWF 506. In response to the service request, AMF 507 requests UE 502 profile 522 from UDM 509. UDM 509 requests UE 502 profile 522 from UDR 510. UDR 510 transfers UE 502 profile 522 to UDM 509, and UDM 509 transfers UE 502 profile 522 to AMF 507. UE 501 profile 522 indicates NSSAIs, DNNs and their QoS levels, SMS attributes, roaming attributes, RAT types, and authentication mode. The DNNs are used to select SMFs like SMF 511 for internet-access, voice-calling, SMS, emergency communications, satellite uplink/downlink, augmented reality, virtual reality, and/or some other network communications product. AMF 507 and SMF 511 interact to develop UE context like network addresses and to select UPFs like UPF 512. AMF 507 transfers some of the UE context to IWF 506. AMF 507 transfers some of the UE context to UE 502 over IWF 506 and WIFI AN 505. SMF 511 transfers some of the UE context to selected UPF 512. UE 502 then exchanges user data with external data systems (not shown) over WIFI AN 505, IWF 506, and UPF 512 based on the UE context.

Subsequently, UE 502 transfers a service request to AMF 507 over WIFI AN 505 and IWF 506. In response to the service request, AMF 507 requests UE 502 profile 522 from UDM 509. UDM 509 requests UE 502 profile 522 from UDR 510, but UDR 510 does not respond due to an overload or some other condition. In response to the failure of UDR 510, UDM 509 uses shared UE profile 520. Shared UE profile 520 indicates NSSAIs, DNNs and their QoS levels, SMS attributes, roaming attributes, RAT types, and authentication mode. The DNNs are used to select SMFs like SMF 511 for internet-access, voice-calling, SMS, emergency communications, satellite uplink/downlink, augmented reality, virtual reality, and/or some other network communications product. AMF 507 and SMF 511 interact to develop UE context like network addresses and to select UPFs like UPF 512. AMF 507 transfers some of the UE context to IWF 506. AMF 507 transfers some of the UE context to UE 502 over IWF 506 and WIFI AN 505. SMF 511 transfers some of the UE context to selected UPF 512. UE 502 then exchanges user data with external data systems (not shown) over WIFI AN 505, IWF 506, and UPF 512 based on the UE context.

Subsequently, UE 502 transfers a service request to AMF 507 over WIFI AN 505 and IWF 506. In response to the service request, AMF 507 requests UE 502 profile 522 from UDM 509, but UDM 509 does not respond due to an overload or some other condition. In response to the failure of UDM 509, AMF 507 uses shared UE profile 520. Shared UE profile 520 indicates NSSAIs, DNNs and their QoS levels, SMS attributes, roaming attributes, RAT types, and authentication mode. The DNNs are used to select SMFs like SMF 511 for internet-access, voice-calling, SMS, emergency communications, satellite uplink/downlink, augmented reality, virtual reality, and/or some other network communications product. AMF 507 and SMF 511 interact to develop UE context like network addresses and to select UPFs like UPF 512. AMF 507 transfers some of the UE context to IWF 506. AMF 507 transfers some of the UE context to UE 502 over IWF 506 and WIFI AN 505. SMF 511 transfers some of the UE context to selected UPF 512. UE 502 then exchanges user data with external data systems (not shown) over WIFI AN 505, IWF 506, and UPF 512 based on the UE context.

The wireless communication system circuitry described above comprises computer hardware and software that form special-purpose data communication circuitry to serve wireless communication devices based on individual subscriber profiles and a shared subscriber profile. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to serve wireless communication devices based on individual subscriber profiles and a shared subscriber profile.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to serve wireless communication devices based on individual subscriber profiles and a shared subscriber profile, the method comprising:

storing the individual subscriber profiles;

storing the shared subscriber profile;

serving the wireless communication devices based on the individual subscriber profiles; and determining when one or more of the individual subscriber profiles is unavailable for one or more of the wireless communication devices, and in response, serving the one or more of the wireless communication devices based on the shared subscriber profile.

2. The method of claim 1 wherein:

the individual subscriber profiles indicate individual network names;

the shared subscriber profile indicates a shared network name;

serving the wireless communication devices based on the individual subscriber profiles comprises serving the wireless communication devices based on the individual network names; and when the one or more of the individual subscriber profiles is unavailable for the one or more of the wireless communication devices, serving the one or more of the wireless communication devices based on the shared subscriber profile comprises serving the one or more of the wireless communication devices based on the shared network name.

3. The method of claim 1 wherein:

the individual subscriber profiles indicate individual network slice information;

the shared subscriber profile indicates shared network slice information;

serving the wireless communication devices based on the individual subscriber profiles comprises serving the wireless communication devices based on the individual network slice information; and when the one or more of the individual subscriber profiles is unavailable for the one or more of the wireless communication devices, serving the one or more of the wireless communication devices based on the shared subscriber profile comprises serving the one or more of the wireless communication devices based on the shared network slice information.

4. The method of claim 1 wherein:

the individual subscriber profiles indicate individual messaging service attributes;

the shared subscriber profile indicates a shared messaging service attribute;

serving the wireless communication devices based on the individual subscriber profiles comprises serving the wireless communication devices based on the individual messaging service attributes; and when the one or more of the individual subscriber profiles is unavailable for the one or more of the wireless communication devices, serving the one or more of the wireless communication devices based on the shared subscriber profile comprises serving the one or more of the wireless communication devices based on the shared messaging service attribute.

5. The method of claim 1 wherein:

the individual subscriber profiles indicate individual roaming attributes;

the shared subscriber profile indicates a shared roaming attribute;

serving the wireless communication devices based on the individual subscriber profiles comprises serving the wireless communication devices based on the individual roaming attributes; and when the one or more of the individual subscriber profiles is unavailable for the one or more of the wireless communication devices, serving the one or more of the wireless communication devices based on the shared subscriber profile comprises serving the one or more of the wireless communication devices based on the shared roaming attribute.

6. The method of claim 1 wherein:

the individual subscriber profiles indicate individual Radio Access Technology (RAT) types;

the shared subscriber profile indicates a shared RAT type;

serving the wireless communication devices based on the individual subscriber profiles comprises serving the wireless communication devices based on the individual RAT types; and when the one or more of the individual subscriber profiles is unavailable for the one or more of the wireless communication devices, serving the one or more of the wireless communication devices based on the shared subscriber profile comprises serving the one or more of the wireless communication devices based on the shared RAT type.

7. The method of claim 1 wherein:

storing the individual subscriber profiles comprises storing the individual subscriber profiles in a storage network element; and storing the shared subscriber profile comprises storing the shared subscriber profile in a different network element from the storage network element.

8. One or more non-transitory machine-readable storage media that store processing instructions that direct processing circuitry to serve wireless communication devices based on individual subscriber profiles and a shared subscriber profile by performing a method comprising:

storing the individual subscriber profiles;

storing the shared subscriber profile;

serving the wireless communication devices based on the individual subscriber profiles; and determining when one or more of the individual subscriber profiles is unavailable for one or more of the wireless communication devices, and in response, serving the one or more of the wireless communication devices based on the shared subscriber profile.

9. The one or more non-transitory machine-readable storage media of claim 8 wherein:

the individual subscriber profiles indicate individual network names;

the shared subscriber profile indicates a shared network name;

serving the wireless communication devices based on the individual subscriber profiles comprises serving the wireless communication devices based on the individual network names; and when the one or more of the individual subscriber profiles is unavailable for the one or more of the wireless communication devices, serving the one or more of the wireless communication devices based on the shared subscriber profile comprises serving the one or more of the wireless communication devices based on the shared network name.

10. The one or more non-transitory machine-readable storage media of claim 8 wherein:

the individual subscriber profiles indicate individual network slice information;

the shared subscriber profile indicates shared network slice information;

serving the wireless communication devices based on the individual subscriber profiles comprises serving the wireless communication devices based on the individual network slice information; and when the one or more of the individual subscriber profiles is unavailable for the one or more of the wireless communication devices, serving the one or more of the wireless communication devices based on the shared subscriber profile comprises serving the one or more of the wireless communication devices based on the shared network slice information.

11. The one or more non-transitory machine-readable storage media of claim 8 wherein:

the individual subscriber profiles indicate individual messaging service attributes;

the shared subscriber profile indicates a shared messaging service attribute;

serving the wireless communication devices based on the individual subscriber profiles comprises serving the wireless communication devices based on the individual messaging service attributes; and when the one or more of the individual subscriber profiles is unavailable for the one or more of the wireless communication devices, serving the one or more of the wireless communication devices based on the shared subscriber profile comprises serving the one or more of the wireless communication devices based on the shared messaging service attribute.

12. The one or more non-transitory machine-readable storage media of claim 8 wherein:

the individual subscriber profiles indicate individual roaming attributes;

the shared subscriber profile indicates a shared roaming attribute;

serving the wireless communication devices based on the individual subscriber profiles comprises serving the wireless communication devices based on the individual roaming attributes; and when the one or more of the individual subscriber profiles is unavailable for the one or more of the wireless communication devices, serving the one or more of the wireless communication devices based on the shared subscriber profile comprises serving the one or more of the wireless communication devices based on the shared roaming attribute.

13. The one or more non-transitory machine-readable storage media of claim 8 wherein:

the individual subscriber profiles indicate individual Radio Access Technology (RAT) types;

the shared subscriber profile indicates a shared RAT type;

serving the wireless communication devices based on the individual subscriber profiles comprises serving the wireless communication devices based on the individual RAT types; and when the one or more of the individual subscriber profiles is unavailable for the one or more of the wireless communication devices, serving the one or more of the wireless communication devices based on the shared subscriber profile comprises serving the one or more of the wireless communication devices based on the shared RAT type.

14. The one or more non-transitory machine-readable storage media of claim 8 wherein:

storing the individual subscriber profiles comprises storing the individual subscriber profiles in a storage network element; and storing the shared subscriber profile comprises storing the shared subscriber profile in a different network element from the storage network element.

15. A wireless communication network to serve User Equipment (UEs) based on individual subscriber profiles and a shared subscriber profile, the wireless communication system comprising:

a Unified Data Repository (UDR) configured to store the individual subscriber profiles;

a Unified Data Management (UDM) configured to store the shared subscriber profile;

the UDM further configured to serve the UEs based on the individual subscriber profiles; and the UDM further configured to determine when one or more of the individual subscriber profiles is unavailable for one or more of the UEs, and in response, to serve the one or more of the UEs based on the shared subscriber profile.

16. The wireless communication network of claim 15 wherein:

the individual subscriber profiles indicate individual Dynamic Network Names (DNNs);

the shared subscriber profile indicates a shared DNN;

the UDM is configured to serve the UEs based on the individual DNNs; and when the one or more of the individual subscriber profiles is unavailable for the one or more of the UEs, the UDM is configured to serve the one or more of the UEs based on the shared DNN.

17. The wireless communication network of claim 15 wherein:

the individual subscriber profiles indicate individual Network Slice Selection Assistance Information (NSSAIs);

the shared subscriber profile indicates a shared NSSAI;

the UDM is configured to serve the UEs based on the individual NSSAIs; and when the one or more of the individual subscriber profiles is unavailable for the one or more of the UEs, the UDM is configured to serve the one or more of the UEs based on the shared NSSAI.

18. The wireless communication network of claim 15 wherein:

the individual subscriber profiles indicate individual messaging service attributes;

the shared subscriber profile indicates a shared messaging service attribute;

the UDM is configured to serve the UEs based on the individual messaging service attributes; and when the one or more of the individual subscriber profiles is unavailable for the one or more of the UEs, the UDM is configured to serve the one or more of the UEs based on the shared messaging service attribute.

19. The wireless communication network of claim 15 wherein:

the individual subscriber profiles indicate individual roaming attributes;

the shared subscriber profile indicates a shared roaming attributes;

the UDM is configured to serve the UEs based on the individual roaming attributes; and when the one or more of the individual subscriber profiles is unavailable for the one or more of the UEs, the UDM is configured to serve the one or more of the UEs based on the shared roaming attribute.

20. The wireless communication network of claim 15 wherein:

the individual subscriber profiles indicate an individual Radio Access Technology (RAT) types;

the shared subscriber profile indicates a shared RAT type;

the UDM is configured to serve the UEs based on the individual RAT types; and when the one or more of the individual subscriber profiles is unavailable for the one or more of the UEs, the UDM is configured to serve the one or more of the UEs based on the shared RAT type.

* * * * *